(12) United States Patent
Mayo et al.

(10) Patent No.: US 10,631,542 B2
(45) Date of Patent: *Apr. 28, 2020

(54) COMPOSITIONS AND METHODS FOR PROVIDING MICRONUTRIENTS IN CONJUNCTION WITH PLANT GROWTH REGULATION

(75) Inventors: Chapman S. Mayo, St. Paul, MN (US); Kenneth L. Dart, Wenatchee, WA (US); Jeffrey T. McClellan, Coburn, PA (US)

(73) Assignee: Agro-K Corporation, Minneapolis, MN (US)

( * ) Notice: Subject to any disclaimer, the term of this patent is extended or adjusted under 35 U.S.C. 154(b) by 2503 days.

This patent is subject to a terminal disclaimer.

(21) Appl. No.: 12/262,834

(22) Filed: Oct. 31, 2008

(65) Prior Publication Data
US 2010/0113271 A1    May 6, 2010

(51) Int. Cl.
*A01N 59/16* (2006.01)
*A01B 59/06* (2006.01)
*A01N 59/26* (2006.01)
*C05B 7/00* (2006.01)

(52) U.S. Cl.
CPC .............. *A01N 59/26* (2013.01); *C05B 7/00* (2013.01)

(58) Field of Classification Search
CPC ........... A01N 59/26; A01N 37/42; C05B 7/00
See application file for complete search history.

(56) References Cited

U.S. PATENT DOCUMENTS

| | | | | |
|---|---|---|---|---|
| 6,022,831 | A * | 2/2000 | Evans | 504/313 |
| 6,083,882 | A * | 7/2000 | Evans et al. | 504/313 |
| 2006/0084573 | A1 | 4/2006 | Grech et al. | |
| 2011/0105323 | A1* | 5/2011 | Schneider et al. | 504/100 |

FOREIGN PATENT DOCUMENTS

| | | | | |
|---|---|---|---|---|
| JP | 2006-176390 | * | 7/2006 | ............ C05B 3/00 |
| WO | WO 2005/115144 | * | 12/2005 | ............ A01N 37/02 |

OTHER PUBLICATIONS

U.S. Appl. No. 12/198,215, filed Aug. 2008, Chapman, M.*
Greene et al. (APOGEE—A New Growth Retardant for Apples: UMass Extension FactSheet, F-127R, year: 2002).*
Greene et al.—APOGEE—A New Growth Retardant for Apples; 2002, F127R (3 pages).*
Vigor-Mg-Phos (TM) label, Agro-K Corporation, undated (1 pg.).
Vigor-Cal-Phos (TM) label, Agro-K Corporation, undated (1 pg.).
Vigor-Mn-Phos (TM) label, Agro-K Corporation, undated (1 pg.).
VZP (TM) label, Agro-K Corporation, undated (1 pg.).
BASF Corporation "Apogee(R) plant growth regulator" directions, undated (7 pgs.).
BASF Corporation "Apogee(R)" marketing materials, undated (4 pgs.).
Material Safety Data Sheet "LI 700(R)" Loveland Products, Inc., undated (3 pgs.).
Material Safety Data Sheet—Nortrace "CaTs(tm)", Loveland Products, Inc., undated (5 pgs.).
Material Safety Data Sheet "Choice(R) Weather Master" Loveland Products Inc., undated (3 pgs.).
Australian Pesticides and Veterinary Medicines Authority, "Evaluation of the New Active Prohexadione-Calcium in the Produce Regalis Plant Growth Regulator," Public Release Summary, Aug. 2006, entire document (cover, pp. i-v, 1-39).
Lovatt et al., "Phosphite Fertilizers: What Are They? Can You Use Them? What Can They Do?" Better Crops/vol. 90-, 2006, No. 4 (pp. 11-13).

* cited by examiner

*Primary Examiner* — Abigail Vanhorn
*Assistant Examiner* — Mei Ping Chui
(74) *Attorney, Agent, or Firm* — Dicke, Billig & Czaja, PLLC

(57) ABSTRACT

Compositions containing one or more metal phosphites and prohexadione calcium are suitable for providing micronutrients for plant health and growth regulation when applied to agricultural crops.

22 Claims, 2 Drawing Sheets

| Treatment No. | Sample No. | Days from First Application | | | | | | | | |
|---|---|---|---|---|---|---|---|---|---|---|
| | | 7 | 17 | 23 | 30 | 37 | 44 | 51 | 59 | 78 |
| 1 | 1 | 5.2 | 9.8 | 14.2 | 21.5 | 32.1 | 37.3 | 40.4 | 42.9 | 42.9 |
| | 2 | 4.6 | 8.1 | 12.3 | 19.5 | 30.4 | 33.7 | 36.1 | 37.1 | 37.1 |
| | 3 | 5.2 | 9.9 | 14.2 | 22.0 | 31.9 | 36.2 | 38.3 | 39.4 | 40.1 |
| | 4 | 5.6 | 10.4 | 14.5 | 22.1 | 31.4 | 33.9 | 34.7 | 35.0 | 35.0 |
| | Avg | 5.2 | 9.6 | 13.8 | 21.3 | 31.5 | 35.3 | 37.4 | 38.6 | 38.8 |
| 2 | 1 | 5.1 | 8.3 | 10.9 | 13.9 | 17.1 | 18.4 | 18.8 | 19.0 | 19.0 |
| | 2 | 5.2 | 8.9 | 11.7 | 15.4 | 20.7 | 23.7 | 25.6 | 26.9 | 28.5 |
| | 3 | 5.5 | 9.2 | 11.2 | 14.0 | 17.1 | 18.3 | 18.7 | 19.0 | 19.0 |
| | 4 | 5.1 | 8.1 | 10.9 | 13.9 | 17.2 | 18.9 | 19.7 | 20.2 | 20.6 |
| | Avg | 5.2 | 8.6 | 11.2 | 14.3 | 18.0 | 19.8 | 20.7 | 21.3 | 21.8 |
| 3 | 1 | 4.9 | 8.5 | 11.5 | 16.6 | 24.5 | 28.6 | 31.2 | 32.2 | 32.5 |
| | 2 | 5.0 | 8.4 | 11.4 | 15.8 | 20.8 | 22.4 | 23.2 | 23.7 | 23.7 |
| | 3 | 5.0 | 9.1 | 12.4 | 17.4 | 23.8 | 26.6 | 28.4 | 29.4 | 29.8 |
| | 4 | 5.0 | 8.7 | 11.8 | 16.2 | 21.6 | 23.9 | 24.9 | 25.4 | 25.7 |
| | Avg | 5.0 | 8.7 | 11.8 | 16.5 | 22.7 | 25.4 | 26.9 | 27.7 | 27.9 |
| 4 | 1 | 5.4 | 9.0 | 12.4 | 17.9 | 25.5 | 29.5 | 32.3 | 34.2 | 35.0 |
| | 2 | 4.8 | 8.2 | 11.7 | 16.5 | 23.0 | 27.1 | 31.4 | 33.0 | 38.3 |
| | 3 | 5.8 | 10.3 | 13.5 | 19.4 | 25.9 | 28.0 | 29.0 | 28.9 | 28.9 |
| | 4 | 6.2 | 10.0 | 13.2 | 17.6 | 22.7 | 24.3 | 24.9 | 25.4 | 25.5 |
| | Avg | 5.6 | 9.4 | 12.7 | 17.9 | 24.3 | 27.2 | 29.4 | 30.4 | 31.9 |
| 5 | 1 | 5.0 | 8.3 | 10.6 | 13.4 | 16.2 | 17.2 | 17.7 | 18.2 | 18.7 |
| | 2 | 4.4 | 7.7 | 10.1 | 12.8 | 15.9 | 17.5 | 18.0 | 18.8 | 19.6 |
| | 3 | 5.3 | 8.3 | 10.2 | 12.8 | 14.9 | 15.8 | 16.2 | 16.2 | 16.2 |
| | 4 | 5.5 | 8.2 | 10.2 | 12.6 | 14.3 | 14.5 | 14.8 | 15.0 | 15.0 |
| | Avg | 5.1 | 8.1 | 10.3 | 12.9 | 15.3 | 16.3 | 16.7 | 17.1 | 17.4 |
| 6 | 1 | 5.6 | 9.8 | 12.7 | 17.5 | 23.5 | 26.1 | 27.0 | 27.4 | 27.8 |
| | 2 | 5.2 | 8.7 | 11.9 | 16.3 | 21.9 | 24.2 | 24.7 | 25.0 | 25.0 |
| | 3 | 4.7 | 8.0 | 10.7 | 14.4 | 18.2 | 19.1 | 19.2 | 19.6 | 19.6 |
| | 4 | 5.5 | 9.3 | 12.1 | 15.6 | 18.9 | 19.6 | 19.9 | 20.0 | 20.0 |
| | Avg | 5.3 | 9.0 | 11.9 | 16.0 | 20.6 | 22.3 | 22.7 | 23.0 | 23.1 |

FIG. 1

| Treatment No. | Days from First Application | | | | | | | | |
|---|---|---|---|---|---|---|---|---|---|
| | 7 | 17 | 23 | 30 | 37 | 44 | 51 | 59 | 78 |
| 1 | 5.2 ab | 9.6 a | 13.8 a | 21.3 a | 31.5 a | 35.3 a | 37.4 a | 38.6 a | 38.8 a |
| 2 | 5.2 ab | 8.6 bc | 11.2 c | 14.3 d | 18.0 d | 19.8 c | 20.7 c | 21.3 c | 21.8 c |
| 3 | 5.0 b | 8.7 bc | 11.8 c | 16.5 c | 22.7 b | 25.4 b | 26.9 b | 27.7 b | 27.9 b |
| 4 | 5.6 a | 9.4 ab | 12.7 b | 17.9 b | 24.3 b | 27.2 b | 29.4 b | 30.4 b | 31.9 b |
| 5 | 5.1 b | 8.1 c | 10.3 d | 12.9 e | 15.3 e | 16.3 d | 16.7 d | 17.1 d | 17.4 d |
| 6 | 5.3 ab | 9.0 ab | 11.9 c | 16.0 c | 20.6 c | 22.3 c | 22.7 c | 23.0 c | 23.1 c |

FIG. 2

COMPOSITIONS AND METHODS FOR PROVIDING MICRONUTRIENTS IN CONJUNCTION WITH PLANT GROWTH REGULATION

TECHNICAL FIELD

The present invention relates generally to providing micronutrients to agricultural crops in conjunction with plant growth regulation, and in particular, in one or more embodiments, the present disclosure relates to compositions and use of metal phosphites with prohexadione calcium.

BACKGROUND

Prohexadione calcium [calcium 3-oxido-5-oxo-4-propionylcyclohex-3-enecarboxylate] is a known plant growth regulator. Prohexadione calcium is widely used for the regulation of shoot growth in apple trees. However, prohexadione calcium has been recognized as a plant growth regulator for use with agricultural crops including at least apples, pears, peaches, peanuts and grasses.

Prohexadione calcium is sold under the brand name APOGEE in the United States by BASF Corporation, Research Triangle Park, N.C., USA. APOGEE suppresses vegetative growth in apple trees, and thus reduces shoot growth. Infection of apple trees by the fire blight bacteria (*Erwinia amylovora*) is detrimental to apple yields and can even result in the death of the tree if left untreated. While antibiotics are known to treat fire blight infections, the bacteria may be developing a resistance to many antibiotics. To reduce the need for antibiotics, an alternative is to pro-actively manage the infection risk. Because tree shoots are new vegetative growth, their softer tissue is more prone to infection, Thus, by reducing shoot growth, infection risk is reduced, thereby reducing the likelihood that subsequent treatment will be necessary.

Calcium is one example of a valuable micronutrient, notably for fruits crops such as apples. However, BASF Corporation acknowledges that research has shown that calcium added to APOGEE will reduce its efficacy and therefore instructs that APOGEE not be tank mixed with calcium sprays. Thus, providing added calcium to the fruit crops in conjunction with prohexadione calcium use has resulted in separate applications of the micronutrient and plant growth regulator.

For the reasons stated above, and for other reasons which will become apparent to those skilled in the art upon reading and understanding the present specification, there is a need in the art for alternative approaches to providing micronutrients to plants in conjunction with prohexadione calcium-based plant growth regulators.

BRIEF DESCRIPTION OF THE DRAWINGS

FIG. 1 is a table of data collected from testing of a composition in accordance with an embodiment of the disclosure against a control and alternate compositions.

FIG. 2 is a table summarizing a statistical analysis of the data of FIG. 1.

DETAILED DESCRIPTION

In the following detailed description of the present embodiments, the embodiments are described in sufficient detail to enable those skilled in the art to practice the invention, and it is to be understood that other embodiments may be utilized and that process, chemical, or mechanical changes may be made without departing from the scope of the present disclosure. The following detailed description is, therefore, not to be taken in a limiting sense.

To address the desire to increase calcium micronutrient availability to plants in conjunction with a prohexadione calcium-based growth regulator, various embodiments employ calcium phosphite ($CaHPO_3$) that is mixed with prohexadione calcium. Calcium phosphite has been used with fruit crops, and is known to be a systemic micronutrient.

In direct contrast to the expectation of the prior art research noted by the BASF Corporation, testing described herein of aqueous solutions containing calcium phosphite and prohexadione calcium has demonstrated no reduction in prohexadione calcium efficacy. In fact, the addition of calcium phosphite to the prohexadione calcium has shown an improvement in shoot growth suppression over the use of prohexadione calcium without added calcium. Phosphites have been shown to increase nutrient uptake into plant tissues. It is believed that the systemic action of phosphites influences the prohexadione calcium efficacy, and that the bonding of the metal to the phosphite anion suppresses any negative interaction of the metal, e.g., the calcium content of the calcium phosphite, with the prohexadione calcium.

In addition to calcium phosphite, other metal phosphite nutrients are known micronutrient sources, such as zinc phosphite ($ZnHPO_3$), manganese phosphite ($MnHPO_3$), magnesium phosphite ($MgHPO_3$) and copper phosphite ($CuHPO_3$). Such metal phosphites may be produced, for example, through the reaction of a metal carbonate with phosphorous acid. For example, a reaction product of calcium carbonate and phosphorous acid is calcium phosphite.

In accordance with the disclosure herein, additional or alternative embodiments employ compositions containing one or more metal phosphites and prohexadione calcium. Compositions in accordance with certain embodiments may further contain additional chemical components that do not materially affect the basic and novel properties of the compositions disclosed herein. Some examples include fillers, flow agents, desiccants, dyes, stabilizers, buffers, conditioners, surfactants, preservatives, organic materials, other fertilizers (other than metal phosphites), other plant growth regulators (other than prohexadione calcium), herbicides, fungicides and insecticides. Compositions in accordance with various embodiments should be foliar applied, such as by using a boom spray, an air blaster or the like.

A field study has been performed to evaluate solutions containing prohexadione calcium and calcium phosphite against solutions containing prohexadione calcium and other calcium sources and a solution containing prohexadione calcium with no additional calcium source. Additionally, each of these test solutions was compared to a control where no prohexadione calcium was applied.

The tested crop was red delicious apples. Each tested solution contained CHOICE WEATHER MASTER water conditioner, described as an aqueous mixture of salts containing ammonium sulfate and propionic acid, and LI 700 surfactant, described as a blend of methylacetic acid, processed lecithin and surfactant, both available from Loveland Products, Inc. of Greeley, Colo., USA. Both materials are commonly used in treatments of prohexadione calcium, e.g., to condition the water and remove mineral calcium, and to improve leaf coverage during application. Although generally thought to be advantageous as noted, such components are not considered to be essential to deriving the benefits of the various embodiments.

Four sources of nutrient calcium were tested. A first calcium source was CATS, also available from Loveland Products, Inc. of Greeley, Colo., USA. CATS is a solution containing 6% calcium by weight as calcium ammonium thiosulfate. Each gallon (3.79 liter) of CATS contains 0.63 pounds (0.29 kg) of calcium. A second calcium source was NORTRACE 10% CALCIUM, also available from Loveland Products, Inc. of Greeley, Colo., USA. NORTRACE 10% CALCIUM is a solution containing 10% calcium by weight as calcium nitrate. Each gallon (3.79 liter) of NORTRACE 10% CALCIUM contains 1.2 pounds (0.54 kg) of calcium. A third calcium source was SYSSTEM-CAL, available from Agro-K Corporation, Minneapolis, Minn., USA. SYSSTEM-CAL is a solution containing 4% calcium by weight as calcium phosphite. Each gallon (3.79 liter) of SYSSTEM-CAL contains 0.4 pounds (0.17 kg) of calcium. The fourth calcium source was VIGOR-CAL, also available from Agro-K Corporation, Minneapolis, Minn., USA. VIGOR-CAL is a solution containing 5% calcium by weight as calcium carbonate. Each gallon (3.79 liter) of VIGOR-CAL contains 0.5 pounds (0.22 kg) of calcium. The prohexadione calcium source was APOGEE, from BASF Corporation, Research Triangle Park, N.C., USA. APOGEE is a solid granule form containing 27.5% prohexadione calcium by weight. When referring to concentrations herein, percentages refer to weight percentages unless otherwise noted. Furthermore, weights and concentrations of the metal phosphites and the like, unless otherwise noted, are determined on a metal basis, i.e., the phosphite anion ($HPO_3$) is not considered in calculating weight or concentration of the metal phosphite, as the corresponding metals are the desired micronutrients. Table 1 summarizes the various treatments investigated.

TABLE 1

| Treatment Number | Tested Solution |
|---|---|
| 1 | Control - Untreated |
| 2 | Prohexadione Calcium |
| 3 | Prohexadione Calcium and Calcium Ammonium Thiosulfate |
| 4 | Prohexadione Calcium and Calcium Nitrate |
| 5 | Prohexadione Calcium and Calcium Phosphite |
| 6 | Prohexadione Calcium and Calcium Carbohydrate |

The first tested solution, corresponding to treatment number 2, contained 16 fl oz/acre (1.17 l/hectare) of the CHOICE WEATHER MASTER, 4 oz/acre (0.07 kg/hectare) of the APOGEE and 16 fl oz/acre (1.17 l/hectare) of the LI 700 in water, with no added calcium source. The second tested solution, corresponding to treatment number 3, contained 16 fl oz/acre (1.17 l/hectare) of the CHOICE WEATHER MASTER, 4 oz/acre (0.07 kg/hectare) of the APOGEE, 64 fl oz/acre (4.68 l/hectare) of the CATS and 16 fl oz/acre (1.17 l/hectare) of the LI 700 in water. The third tested solution, corresponding to treatment number 4, contained 16 fl oz/acre (1.17 l/hectare) of the CHOICE WEATHER MASTER, 4 oz/acre (0.07 kg/hectare) of the APOGEE, 64 fl oz/acre (4.68 l/hectare) of the NORTRACE 10% CALCIUM and 16 fl oz/acre (1.17 l/hectare) of the LI 700 in water. The fourth tested solution, corresponding to treatment number 5, contained 16 fl oz/acre (1.17 l/hectare) of the CHOICE WEATHER MASTER, 4 oz/acre (0.07 kg/hectare) of the APOGEE, 64 fl oz/acre (4.68 l/hectare) of the SYSSTEM-CAL and 16 fl oz/acre (1.17 l/hectare) of the LI 700 in water.

The fifth tested solution, corresponding to treatment number 6, contained 16 fl oz/acre (1.17 l/hectare) of the CHOICE WEATHER MASTER, 4 oz/acre (0.07 kg/hectare) of the APOGEE, 64 fl oz/acre (4.68 l/hectare) of the VIGOR-CAL and 16 fl oz/acre (1.17 l/hectare) of the LI 700 in water. The total solution application rates were approximately 50 gal/acre (189 l/hectare). These test solutions were applied at petal fall, first cover, second cover, third cover and bloom.

FIG. 1 is a table of data collected from red delicious apple trees of the control group and the test groups. The methodology included measuring shoot growth on four sample trees from each group. Ten shoots were measured, in centimeters, from each of the sample trees and averaged. Averages of each sample tree were then averaged as being representative of the average shoot growth of their respective groups. The first application of the various solutions was made when bloom was deemed to occur for the orchard containing the trees. The second application was made when petal fall was deemed to occur, or 9 days after the first application. The third application was made when first cover was deemed to occur, or 31 days after the first application. The fourth application was made when second cover was deemed to occur, or 46 days after the first application. And the fifth application was made when third cover was deemed to occur, or 60 days after the first application. Sampling was performed at 7, 17, 23, 30, 37, 44, 51, 59 and 78 days from first application.

FIG. 2 is a table summarizing a statistical analysis of the data of FIG. 1. The alpha designators following the average shoot length values indicate the relative statistical significance of the various treatments for a given sample day. For example, each value within a given sample day sharing an alpha designator is deemed to be statistically equivalent. Furthermore, higher alpha designators indicate improved growth suppression. Thus, for example, for samples taken 17 days after first application, treatment 2 was statistically equivalent to all other treatments other than the control group (treatment 1) in that it shares an alpha designator "b" with treatments 3, 4 and 6, and it shares an alpha designator "c" with treatments 3 and 5. By day 23, treatment 2 was statistically equivalent to only treatments 3 and 6.

In review of FIG. 2, it can be seen that from day 23 after first application of the tested solutions, treatment 5 (prohexadione calcium+calcium phosphite) provided the highest level of growth suppression with statistical significance. Unexpectedly, in view of the warnings against adding calcium sources to prohexadione calcium, the growth regulation of treatment 5 is statistically improved over that of treatment 2 (prohexadione calcium without additional calcium source). As noted above, due to the systemic nature of phosphites, other metal phosphites may also facilitate increased efficacy of the prohexadione calcium.

In accordance with various embodiments, compositions for providing micronutrients and growth regulation include aqueous solutions containing one or more metal phosphites and prohexadione calcium. The compositions should contain an efficacious amount of prohexadione calcium to provide for a desired level of growth regulation and an efficacious amount of micronutrients for promoting plant health. For example, compositions in accordance with various embodiments of this disclosure may include aqueous solutions containing 1-10% of one or more metal phosphites, measured on a metal basis, and 1-25% of prohexadione calcium. While such concentrations are believed to be appropriate for ease of manufacturing and economy in transportation, these compositions may be combined with additional water prior to application. Alternatively, compositions in accordance with various embodiments of this disclosure include aqueous solutions containing 0.02-6 lbs (0.01-2.7 kg) of one or more metal phosphites, measured on a metal basis, for each pound (0.45 kg) of prohexadione calcium. In this manner, application rates of prohexadione calcium can be approximately 0.2-3.0 lbs/acre (0.22-3.4 kg/hectare) while providing suitable levels of each of the micronutrients, without regard to concentration of the applied solution. However, it may be desirable to limit the amount of metal phosphites to a level to provide application rates in the range of approximately 0.01-1.5 lbs/acre (0.01-1.7 kg/hectare) of any one metal phosphite. For a further embodiment, the composition may include aqueous solutions containing 0.02-6 lbs (0.01-2.7 kg) of calcium as calcium phosphite for each pound (0.45 kg) of prohexadione calcium. For a still further embodiment, the composition may include aqueous solutions containing 1.0-4.0 lbs (0.45-1.8 kg) of calcium as calcium phosphite for each pound (0.45 kg) of prohexadione calcium.

Although application methods generally call for an aqueous solution, metal phosphites can be provided as free-flowing solids, similar to prohexadione calcium. As such, compositions in accordance with various embodiments may utilize metal phosphites in substantially the same form, e.g., granular, as commonly-available prohexadione calcium. These compositions could be mixed with water prior to application to place the prohexadione and metal phosphites in solution. As noted above, other components may also be added to the resulting solution, e.g., conditioners, surfactants or other additives. For one embodiment, such free-flowing solids compositions contain 3-99% prohexadione calcium and 1-97% of one or more metal phosphites by total weight. For another embodiment, a free-flowing solids composition may contain 3-40% prohexadione calcium and 2-40% of one or more metal phosphites by total weight. For the various free-flowing solids embodiments, other components may generally be added, such as flow agents, fillers or desiccants, for ease of handling and storage. For a further embodiment, a free-flowing solids composition may contain 0.02-6 lbs (0.01-2.7 kg) of one or more metal phosphites, measured on a metal basis, for each pound (0.45 kg) of prohexadione calcium. For a still farther embodiment, a free-flowing solids composition may contain 1.0-4.0 lbs (0.45-1.8 kg) of calcium as calcium phosphite for each pound (0.45 kg) of prohexadione calcium.

Methods of treating agricultural crops in accordance with various embodiments include applying solutions containing at least prohexadione calcium and one or more metal phosphites to the crop, e.g., apples. The treatment of a crop can be a single application or multiple applications of solutions in accordance with various embodiments. In general, single applications would utilize a higher concentration of prohexadione calcium than multiple, or split, applications for similar results. Broadcast application, e.g., foliar application, is generally advised.

Although specific embodiments have been illustrated and described herein, it will be appreciated by those of ordinary skill in the art that any arrangement that is calculated to achieve the same purpose may be substituted for the specific embodiments shown. Many adaptations of the disclosure will be apparent to those of ordinary skill in the art. Accordingly, this application is intended to cover any adaptations or variations of the disclosure.

What is claimed is:

1. A method of treating agricultural crops, comprising:
   applying a composition to a crop, wherein the composition comprises prohexadione calcium and one or more metal phosphites in aqueous solution;
   wherein the one or more metal phosphites are selected from the group consisting of zinc phosphite, manganese phosphite, magnesium phosphite, calcium phosphite, iron phosphite and copper phosphite; and
   wherein at least one of the one or more metal phosphites comprises calcium phosphite.

2. The method of claim 1, wherein applying the composition comprises applying the composition at a rate to provide an amount of prohexadione calcium that is efficacious for growth regulation of the crop.

3. The method of claim 1, wherein applying the composition comprises applying the aqueous solution comprising 0.02-6.0 lbs of one or more of the metal phosphites, measured on a metal basis, for every 1.0 lb of prohexadione calcium.

4. The method of claim 1, wherein applying the composition comprises applying the aqueous solution comprising 1.0-4.0 lbs of calcium as calcium phosphite for every 1.0 lb of prohexadione calcium.

5. The method of claim 1, wherein applying the composition comprises applying the composition to provide 0.2-3.0 lbs/acre of prohexadione calcium and 0.01-1.5 lbs/acre of one or more of the metal phosphites, measured on a metal basis.

6. The method of claim 1, wherein applying the composition comprises applying the composition using a broadcast application method.

7. The method of claim 6, wherein the broadcast method of application is selected from the group consisting of boom spray and air blaster.

8. The method of claim 1, wherein applying the composition comprises applying the composition to apple trees.

9. A composition for treatment of agricultural crops, comprising:
   prohexadione calcium; and
   one or more metal phosphites;
   wherein the one or more metal phosphites are selected from the group consisting of zinc phosphite, manganese phosphite, magnesium phosphite, calcium phosphite, iron phosphite and copper phosphite; and
   wherein at least one of the one or more metal phosphites comprises calcium phosphite.

10. The composition of claim 9, wherein the composition is an aqueous solution comprising 1-10% by weight of one or more of the metal phosphites, measured on a metal basis, and 1-25% by weight of prohexadione calcium.

11. The composition of claim 9, wherein the composition is a free-flowing solids composition comprising 1-97% by weight of one or more of the metal phosphites by total weight, and 3-99% by weight of prohexadione calcium.

12. The composition of claim 11, wherein the free-flowing solids composition is granular.

13. The composition of claim 11, further comprising one or more additional components selected from the group consisting of flow agents, fillers and desiccants.

14. The composition of claim 9, wherein the composition comprises 0.02-6.0 lbs of one or more of the metal phosphites, measured on a metal basis, for every 1.0 lb of prohexadione calcium.

15. The composition of claim 14, wherein the composition comprises 1.0-4.0 lbs of calcium as calcium phosphite for every 1.0 lb of prohexadione calcium.

16. A composition for treatment of agricultural crops, comprising:
   prohexadione calcium; and
   calcium phosphite.

17. The composition of claim 16, wherein the composition is an aqueous solution comprising 1-10% by weight of calcium as calcium phosphite and 1-25% by weight of prohexadione calcium.

18. The composition of claim 16, wherein the composition is a free-flowing solids composition comprising 2-40% by weight of calcium phosphite, and 3-40% by weight of prohexadione calcium.

19. The composition of claim 16, wherein the composition comprises 0.02-6.0 lbs of calcium as calcium phosphite for every 1.0 lb of prohexadione calcium.

20. The composition of claim 16, further comprising one or more metal phosphites selected from the group consisting of zinc phosphite, manganese phosphite, magnesium phosphite, iron phosphite and copper phosphite.

21. The method of claim 1, comprising applying the composition to the crop, wherein the composition comprises an efficacious amount of prohexadione calcium to provide for growth regulation and an efficacious amount of the one or more metal phosphites for promoting plant health.

22. The composition of claim 16, wherein the composition comprises an efficacious amount of prohexadione calcium to provide for growth regulation and an efficacious amount of calcium phosphite for promoting plant health.

* * * * *